(12) United States Patent
Oohara et al.

(10) Patent No.: US 8,116,914 B2
(45) Date of Patent: Feb. 14, 2012

(54) WIND TURBINE AND OPERATING METHOD THEREOF

(75) Inventors: Shinya Oohara, Hitachi (JP); Masaya Ichinose, Hitachiota (JP); Motoo Futami, Hitachiota (JP); Kazuya Tsutsumi, Hitachinaka (JP); Takashi Shiraishi, Utsunomiya (JP); Shigeo Yoshida, Utsunomiya (JP); Hajime Komiyama, Utsunomiya (JP); Junichi Sugino, Utsunomiya (JP)

(73) Assignees: Hitachi, Ltd., Tokyo (JP); Fuji Heavy Industries Ltd., Tokyo (JP)

( * ) Notice: Subject to any disclaimer, the term of this patent is extended or adjusted under 35 U.S.C. 154(b) by 1212 days.

(21) Appl. No.: 11/841,013

(22) Filed: Aug. 20, 2007

(65) Prior Publication Data

US 2008/0069692 A1  Mar. 20, 2008

(30) Foreign Application Priority Data

Sep. 20, 2006 (JP) .................... 2006-254898

(51) Int. Cl.
*G05D 3/12* (2006.01)
*G05B 19/18* (2006.01)
*G05B 11/01* (2006.01)
*G05B 9/02* (2006.01)
*F03D 9/00* (2006.01)
*B63H 3/00* (2006.01)

(52) U.S. Cl. .................. 700/287; 700/2; 700/3; 700/20; 700/21; 700/82; 700/292; 290/44; 416/36

(58) Field of Classification Search .................. 700/2, 3, 700/4, 9, 10, 20, 21, 79, 82, 287, 292, 293, 700/297; 290/44; 416/31, 36
See application file for complete search history.

(56) References Cited

U.S. PATENT DOCUMENTS

| 4,435,647 | A * | 3/1984 | Harner et al. .................. 290/44 |
| 5,584,655 | A * | 12/1996 | Deering .......................... 416/31 |
| 6,428,274 | B1 | 8/2002 | Hehenberger |
| 6,771,903 | B1 * | 8/2004 | Cousineau ...................... 398/17 |
| 6,921,985 | B2 * | 7/2005 | Janssen et al. ................. 290/44 |
| 7,355,294 | B2 * | 4/2008 | Teichmann ..................... 290/44 |
| 2004/0253093 | A1 * | 12/2004 | Shibata et al. ................. 415/4.1 |
| 2006/0028025 | A1 * | 2/2006 | Kikuchi et al. ................. 290/44 |
| 2007/0090797 | A1 * | 4/2007 | Glosser et al. ................. 320/116 |

FOREIGN PATENT DOCUMENTS

| DE | 20 2005 007 450 | 8/2005 |
| JP | 2005-204350 | 7/2005 |
| WO | WO 99/23384 | 5/1999 |
| WO | WO 2004/067958 A1 | 8/2004 |

OTHER PUBLICATIONS

E. ON Netz GmbH, Bayreuth; Grid Code High and extra high voltage; Status: Apr. 1, 2006; pp. 1-46.

* cited by examiner

*Primary Examiner* — Sean Shechtman
(74) *Attorney, Agent, or Firm* — Antonelli, Terry, Stout & Kraus, LLP.

(57) ABSTRACT

A pitch controller, uninterruptible power supply, and rotational speed detector are disposed in the rotor in a wind turbine. When a slip ring failure or wire breakage occurs, the pitch controller internally creates a pitch angle command so as to control the pitch angle.

18 Claims, 20 Drawing Sheets

GROUND

GROUND

WIND TURBINE AND OPERATING METHOD THEREOF

CLAIM OF PRIORITY

The present application claims priority from Japanese patent application serial No. 2006-254898, filed on Sep. 20, 2006, the content of which is hereby incorporated by reference into this application.

FIELD OF THE INVENTION

The present invention relates to a wind turbine and an operating method thereof.

BACKGROUND OF THE INVENTION

The horizontal-axis wind turbines used in a conventional wind turbine has a plurality of blades (three blades in many cases), the pitch angles of which are changed according to the wind speed so as to change the rotational speed of the rotor and thereby to control the energy efficiency of the blades. The wind turbine has a pitch controller, turbine controller, and power supply facility as a mechanism for changing the pitch angles of the blades. The turbine controller creates a pitch angle command according to the wind speed measurement obtained by an anemometer, the rotational speed detected by a rotational speed detector, and the quantities of the operation mode and other states of the wind turbine. The turbine controller then sends the created pitch angle command to the pitch control unit. The auxiliary equipment has an uninterruptible power supply for supplying power to the pitch controller and turbine controller if the system voltage drops due to a grid failure, thereby enabling pitch angle control to be continued according to a command from the turbine controller even during the grid failure. The above technology is described in, for example, WO 2004/067958.

SUMMARY OF THE INVENTION

The pitch controller is disposed in a rotor. The turbine controller is disposed in a nacelle or tower. To transfer a pitch angle signal to the pitch controller and supply operation power to the pitch controller, therefore, a slip ring must be passed through. If the slip ring part fails, no pitch angle command is sent to the pitch controller and no power is supplied. A similar event may happen if the pitch angle signal transmission line or power line is broken. In this case, the rotational speed of the rotor cannot be controlled, increasing the rotational speed of the wind turbine.

In a preferred embodiment of the present invention, the pitch controller, uninterruptible power supply, and rotational speed detector are disposed in the rotor of the wind turbine. If the slip ring fails or a line breakage occurs, a pitch angle command is created by the pitch controller so as to control the pitch angle.

According to the present invention, pitch angle control can be performed more reliably, thereby preventing over speed in the wind turbine.

Other objects and features of the present invention will be clarified in the embodiments described below.

DESCRIPTION OF THE PREFERRED EMBODIMENTS

In a preferred embodiment of the present invention, the pitch controller and uninterruptible power supply are disposed in the rotor of the wind turbine. The pitch controller creates a pitch angle command according to the quantity of the state of the wind turbine and controls the pitch angle according to the created pitch angle command. The uninterruptible power supply in the rotor supplies power to the pitch controller.

First Embodiment

Figure 1:
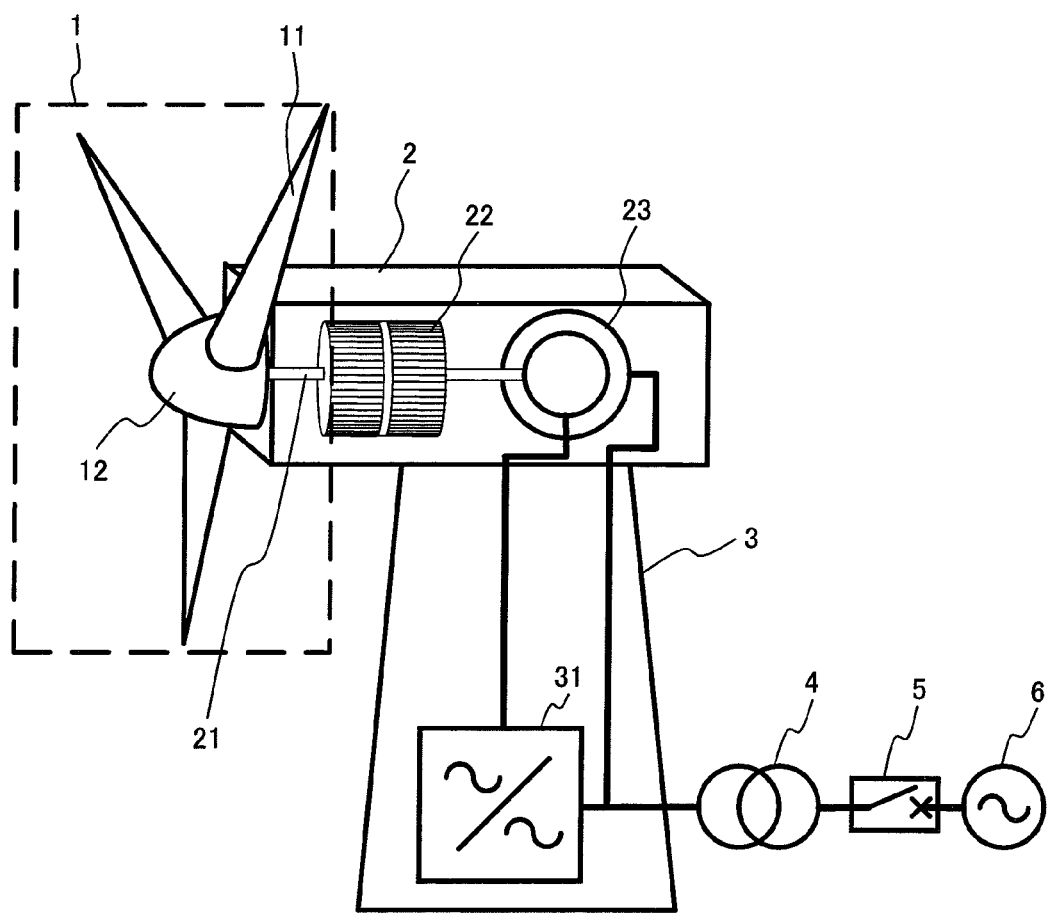
FIG. 1 shows a structure of a wind turbine in a first embodiment of the present invention.

The structure of a wind turbine in a first embodiment of the present invention will be described first with reference to FIG. 1. The wind turbine receives wind by use of blades 11 and converts the wind energy into rotational energy. The rotational energy rotates a hub 12 to which the blades 11 are attached. The rotational part comprising the blades 11 and hub 12 is referred to as a rotor 1. The rotation of the rotor 1 is transmitted to an accelerating gear 22 through a shaft 21. The accelerating gear 22 changes the rotational speed of the rotor 1 to another rotational speed suitable for a power generator 23. In FIG. 1, a doubly-fed generator is shown as the power generator 23. In the doubly-fed generator, a power grid and a power converter are connected to the stator winding and the rotor winding, respectively, through a slip ring. The present invention can be used even when the power generator 23 is a permanent magnet generator or induction generator 23a.

Figure 2:
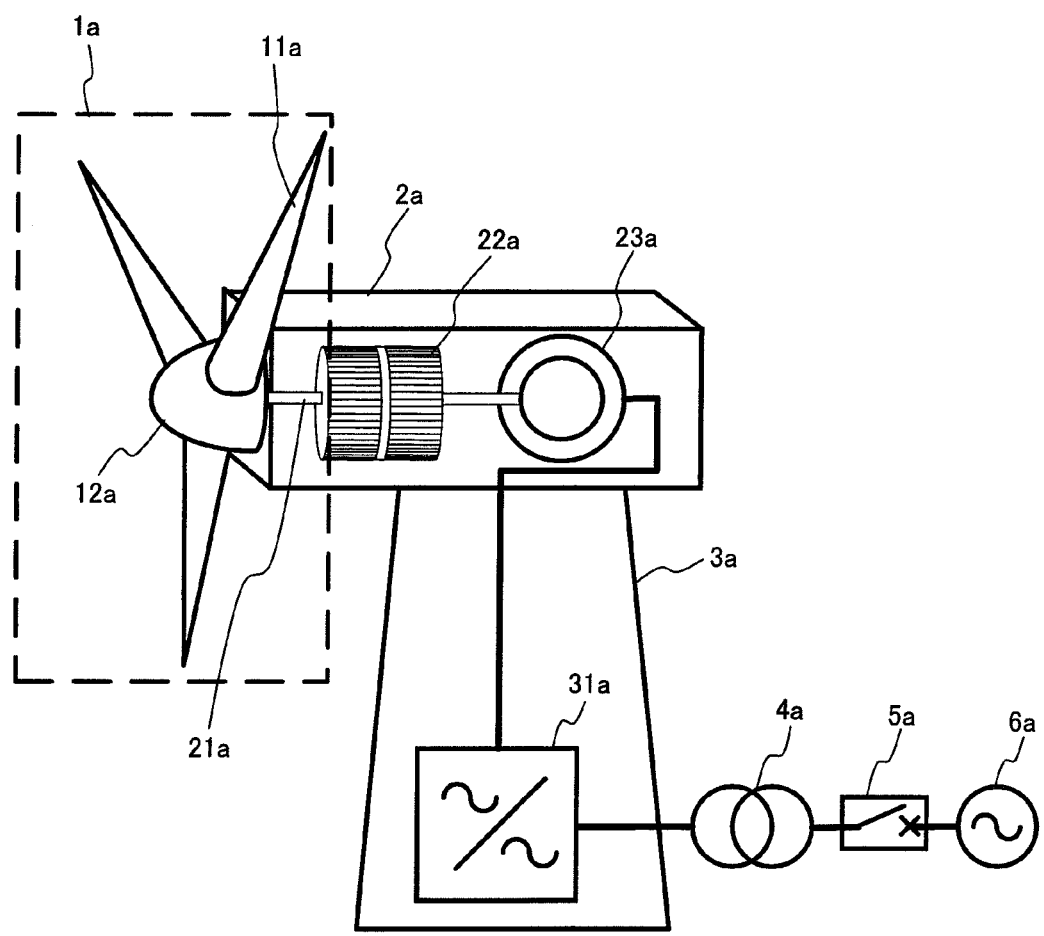
FIG. 2 shows another structure of the wind turbine in the first embodiment of the present invention.

FIG. 2 shows another structure of the wind turbine in the first embodiment of the present invention, in which a permanent magnet generator or induction generator is used as the power generator 23. The rotational energy of the rotor 1 is converted by the power generator 23 into electric energy and then transferred to a power converter 31. The power converter 31 controls the frequency, voltage, phase, and power of the AC power output by the power generator 23. Electrical energy, which is the electric power generated by the wind turbine, is supplied to a power grid 6 through a transformer 4 and breaker 5.

The pitch angle of the blade 11 can be controlled. When the angle of the blade is adjusted, the electric power generated by the wind turbine and the rotation speed thereof can be controlled.

Figure 3:
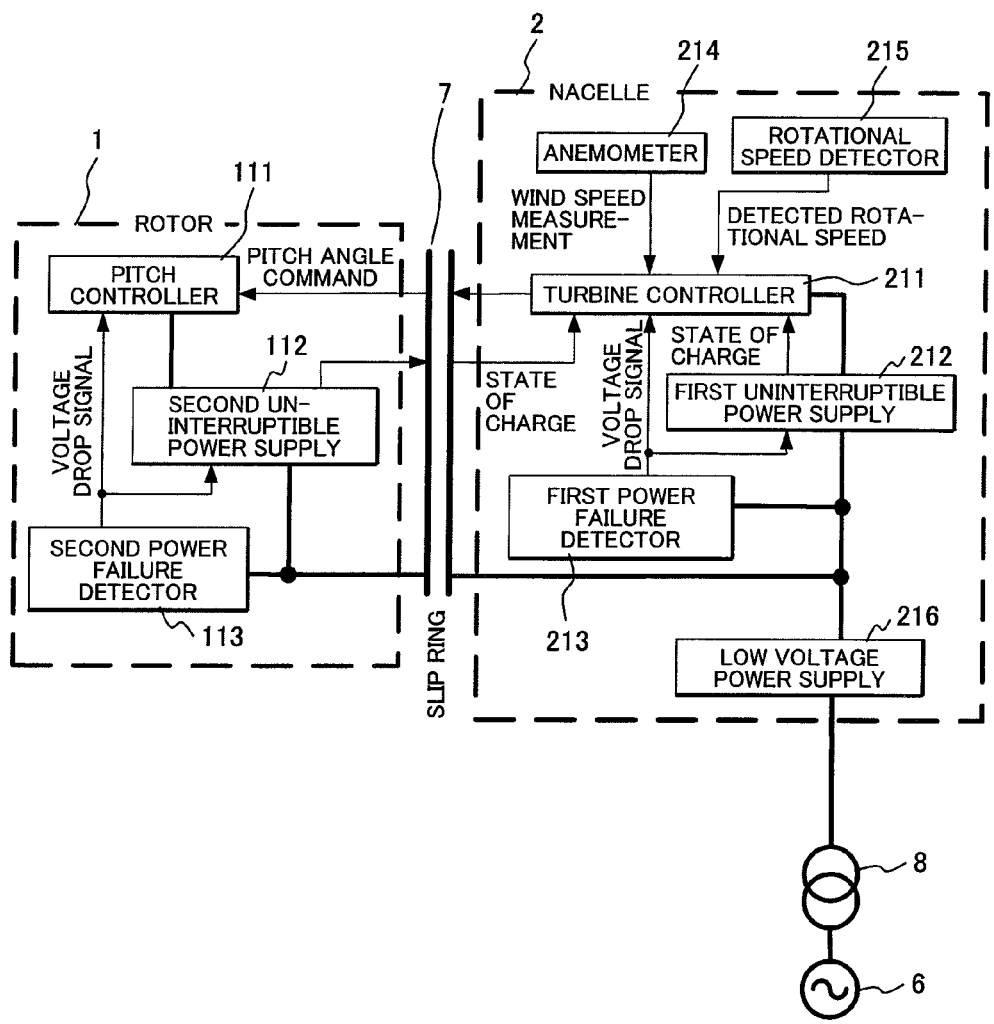
FIG. 3 shows the structure of the pitch angle control mechanism of the wind turbine in the first embodiment of the present invention.

FIG. 3 shows the structure of the pitch angle control mechanism of the wind turbine in a first embodiment of the present invention. According to this embodiment, a pitch controller 111, second uninterruptible power supply 112, and second power failure detector 113 are disposed in the rotor 1. In the nacelle, a turbine controller 211, first uninterruptible power supply 212, first power failure detector 213, and low voltage power supply 216 are disposed. The turbine controller 211, first uninterruptible power supply 212, first power failure detector 213, and low voltage power supply 216 may be disposed in the tower 3. The pitch controller 111 comprises an electric motor for changing the angles of the blades, a control unit for controlling the amount of rotation of the electric motor, and a power converter for sending power to the electric motor. The second uninterruptible power supply 112 receives power supplied from the nacelle and then supplies the power to the pitch controller 111. The second uninterruptible power supply 112 has a built-in storage battery; when power is not supplied to the second uninterruptible power supply, therefore, it can supply power to the pitch controller 111 for a short period of time.

The turbine controller 211 in the nacelle 2 outputs an appropriate pitch angle by referencing a data table stored in the turbine controller 211 with respect to wind speed measurements, detected rotational speeds of the rotor, and other quantities of states. The first uninterruptible power supply 212 receives power supplied from the low voltage power supply 216 and supplies the power to the turbine controller 211. The power supplied from the low voltage power supply 216 is obtained by converting a high voltage (AC 6.6 kV, AC 66 kV, AC 22 kV, AC 77 kV, etc.) of the power grid connected to the wind turbine by a transformer into a low voltage (AC 100 V, AC 200 V, AC 400 V, etc.). A slip ring 7 is passed through when power and a pitch angle command are supplied from the nacelle 2 to the rotor 1.

Figure 4:
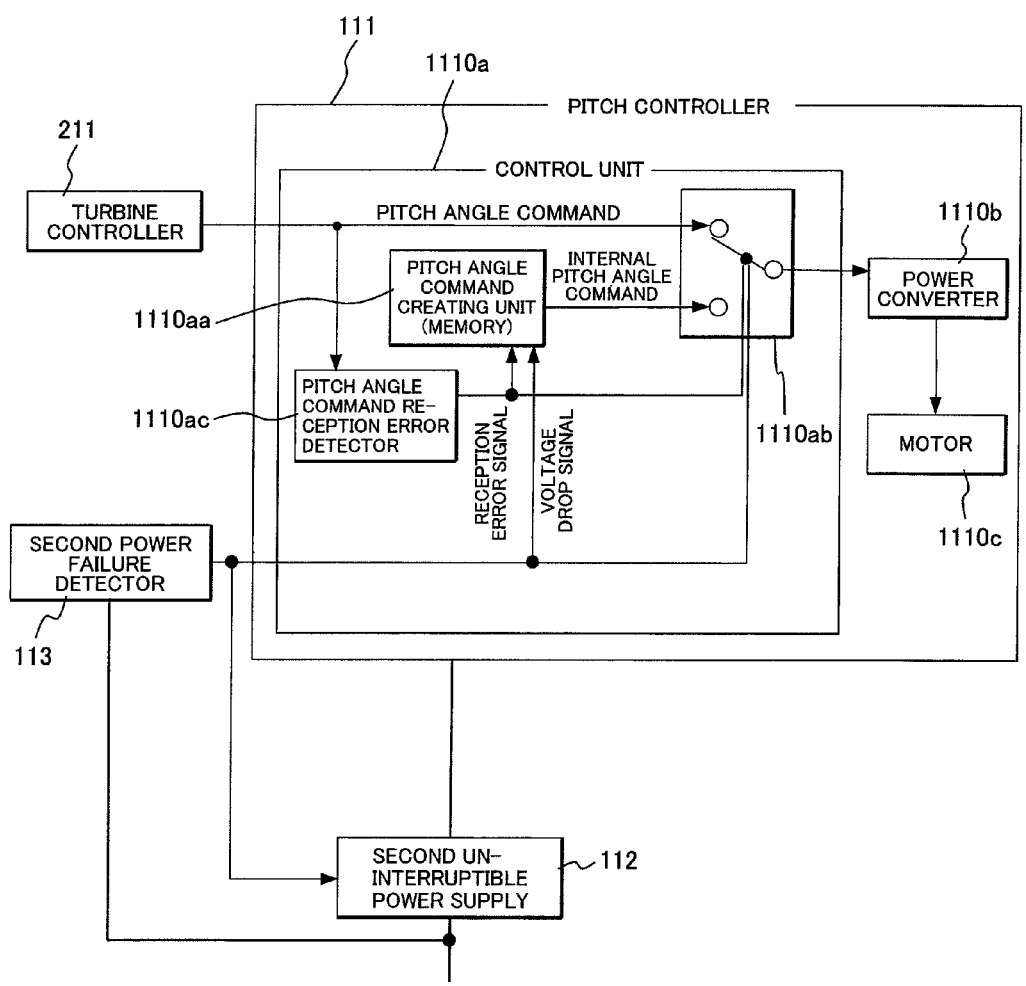
FIG. 4 shows the structure of the pitch controller in the first embodiment of the present invention.

FIG. 4 shows the structure of the pitch controller in the first embodiment of the present invention. While in normal power generation operation, the pitch controller 111 receives a pitch angle command from the turbine controller 211 and controls the pitch angle by running the motor so that the pitch angle matches the commanded value. However, it is assumed that the pitch angle command from the turbine controller 211 cannot be received correctly due to electric noise or another factor. The pitch angle command may also not be transmitted due to, for example, a failure of the slip ring 7. Alternatively, a correct pitch angle command value may not be received due to a failure of the turbine controller 211. When this happens, the pitch controller 111 controls the pitch angle by the procedure described below. When a pitch angle command reception error detector 1110ac in the pitch controller 111 determines that a pitch angle signal has not been received correctly, the pitch controller 111 internally creates a pitch angle command. When determining that there is a temporary reception error due to electric noise, for example, the pitch controller 111 creates a pitch angle command having the same value as the last pitch angle command that it has received normally. The pitch controller 111 does not follow the pitch angle command from the turbine controller 211 but selects the internally created pitch angle command and changes the pitch angle. The pitch controller 111 may determine that it will not be capable of receiving a pitch angle command for a long period of time due to a line breakage, a failure of the slip ring 7 or turbine controller 211, or another factor. In this case, the pitch controller 111 outputs a pitch angle command by referencing a data table of pitch angle commands stored in an internal memory, so that the blades 11 gradually shift to a feather state. The feather state refers to a state in which the angles of the blades 11 are made nearly parallel to the wind direction by setting the pitch angle of at least one of the blades 11 or preferably the pitch angles of all of the blades 11 to a minimum controllable value. When the blades 11 are placed in the feather state, the input torque of the rotor 1 that is received from the wind can be lessened. For this reason, when the wind turbine stops power generation and the rotation of the rotor 1 is idled, the blades 11 are usually placed in the feather state. When the rotational speed of the rotor 1 is high, if the blades 11 are shifted to the feature state abruptly, an excessive load is applied to the blades 11 and rotor 1. To shift to the feather state, therefore, the pitch angles should be changed slowly in time to gradually lower the rotational speed of the rotor 1. The pitch controller 111 gradually shifts the pitch angles to the feather state by selecting an internally created pitch angle command without following a pitch angle command from the turbine controller 211. After the pitch angles have been completely shifted to the feather state, the pitch controller 111 waits in the feather state until a correct pitch angle command can be received.

The above example has been applied to a case in which a pitch angle command cannot be received. However, a similar operation is also performed when power supply to the pitch controller 111 is stopped. Power is supplied to the pitch controller 111 through the slip ring 7 as in the case of pitch angle command sent from the turbine controller 211. When the slip ring 7 fails, therefore, control power to the pitch controller is stopped. Since the second uninterruptible power supply can only supply power to the pitch controller in a short period of time, after power supply from the second uninterruptible power supply is stopped, the pitch controller cannot respond to a pitch angle command from the turbine controller, resulting in the inability to control the pitch angles. Similar events may be caused when a grid failure occurs. If an accident such as a lightning strike occurs in the power grid to which the wind turbine is connected, the voltage of the power grid may be extremely dropped, preventing power from being supplied to the rotor 1. When power supply to the rotor 1 is stopped due to a failure of the slip ring 7 or an error in the power grid as described above, the pitch controller 111 operates as follows. First, when detecting that the voltage of the supplied power has dropped below a reference value, the second power failure detector 113 in the rotor 1 sends a voltage drop signal to the pitch controller 111 and second uninterruptible power supply 112. The second uninterruptible power supply 112 switches to operation to supply internally stored power. After receiving the voltage drop signal, the pitch controller 111 outputs an internally stored pitch angle command by which a shift to the feather state is caused slowly in time. The pitch controller 111 gives priority to the internally created pitch angle command over the pitch angle command from the turbine controller 211 and executes the prioritized pitch angle command to change the pitch angle. The pitch controller 111 changes the pitch angle to the feather state and enters a standby mode.

Figure 5:
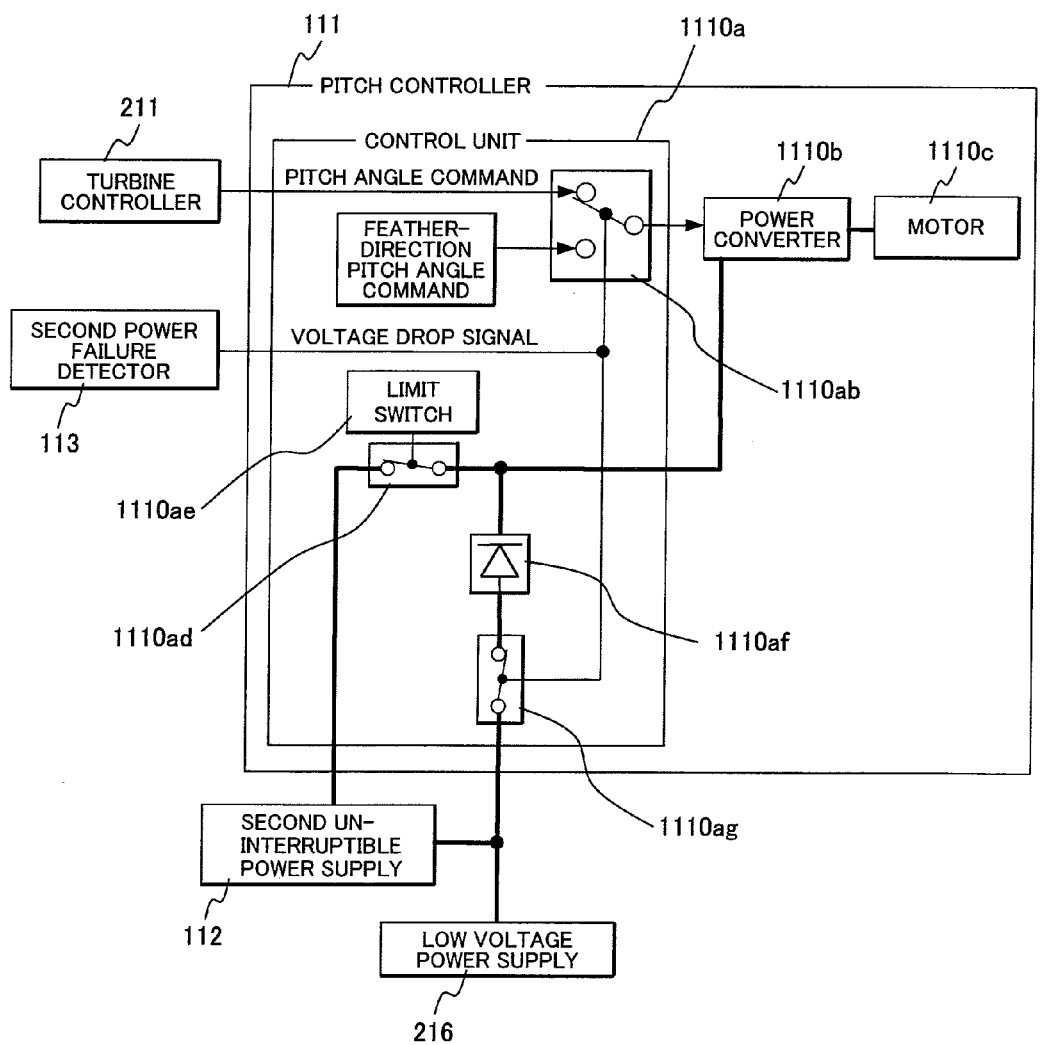
FIG. 5 shows another exemplary structure of the pitch angle control in the embodiment of the present invention.

FIG. 5 shows another exemplary structure that implements pitch angle control executed when the system voltage drops.

In this exemplary structure, the low voltage power supply 216 supplies electric power to a power converting section 1110*b* in the pitch controller 111 during normal operation. When the system voltage drops, the pitch controller 111 operates as described below. First, the second power failure detector 113 detects the voltage drop and outputs a voltage drop signal. Upon receipt of the voltage drop signal, a relay 1110*ag* shuts down the electric power supplied from the low voltage power supply 216 to the power converting section 1110*b*. The second uninterruptible power supply 112 supplies electric power to the power converting section 1110*b*, so pitch angle control is possible even when a voltage drop occurs. When the power converting section 1110*b* receives the voltage drop signal, it does not respond to a pitch angle command from the turbine controller but rotates the motor 1110*c* in a direction that causes the pitch angle is placed in the feather state. A limit switch 1110*ae* is preset so that when the pitch angle falls to or below a prescribed value, a relay 1110*ad* operates. Accordingly, when the pitch angle falls to or below a prescribed value near the feather state, the relay 1110*ad* operates to shut down the electric power to be supplied to the power converting section 1110*b*. The motor 1110*c* then stops and the pitch angle is fixed near the feather state. An arrangement as described above enables the pitch angle to be changed to the feather state in a safe manner even when a voltage drop occurs.

To perform pitch angle control correctly when power supply to the rotor 1 is stopped, it is necessary that power required at least to change the pitch angle to the feather state has been stored in the second uninterruptible power supply 112. When the state of charge of the second uninterruptible power supply 112 is below respective preset value, therefore, the wind turbine does not preferably shift to the power generating state. In this type of operation method, a minimum necessary energy is stored, enabling the uninterruptible power supply to be compact.

A similar operation method is applied to the first uninterruptible power supply 212. In case that control power supply is stopped due to a grid failure, the first uninterruptible power supply 212 needs to have stored electric power required for the turbine controller 211 to shift the wind turbine to an idling state at least. Accordingly, when the state of charge of the first uninterruptible power supply 212 is below a preset value, the wind turbine does not shift to the power generating state.

The first uninterruptible power supply and second uninterruptible power supply each have any one of a storage battery, capacitor, electric double layer capacitor, and fuel cell, or may have a combination of a plurality of these elements.

Even when a pitch angle command is not transferred correctly to the rotor 1 or control power is not supplied thereto, the operation described above enables pitch angle control, resulting in more reliable pitch angle control.

Second Embodiment

A second embodiment of the present invention differs from the first embodiment in that the wind turbine has a rotational speed detector in the rotor.

In case of a system voltage drop due to a grid fault, wind turbines have been allowed to be disconnected from the power grid. As more wind turbines have been linked recently, this regulation is being changed. When, for example, several tens to several hundreds of wind turbines, each having a capacity of 500 kW to several megawatts, are disposed in a single place, a total power generation capacity reaches hundreds of megawatts. This type of large-scale wind power facility needs to be handled in the same way as large power generating facilities such as conventional thermal power plants and hydroelectric power plants. When the above large-scale wind power facility is disconnected from the power grid at the time of a temporary voltage drop in the power grid, the power grid is affected as if a large power generating facility were lost. Accordingly, if wind turbines are disconnected from the power grid at the time of a temporary voltage drop, when the grid fault clearance, it becomes difficult for the power grid to return to the normal state, leading to power outage in a wide area.

In Europe where many wind turbines are already used, a guideline for linking wind turbines has been created, assuming this type of event. According to the guideline, the wind turbines must be left connected to the power grid for a fixed length of time even while the system voltage is lowered due to a grid failure. When the grid failure is removed, the wind turbines required to be restored to the power generation state before the grid failure in a short period of time.

When wind turbines are allowed to be disconnected at the occurrence of a grid failure as before, each wind turbine needs to stop the rotation of the rotor 1 by placing the pitch angle in the feather state. To do this, either of the structures shown in the first embodiment may be used. However, when disconnection is not allowed even at the time of a grid fault and restoration to the power generation state is needed after the grid failure is removed, as indicated in the guideline in Europe, the rotational speed of the rotor 1 in the wind turbine needs to be kept within the range in which power generation is possible even while the power grid voltage is low.

Figure 6:
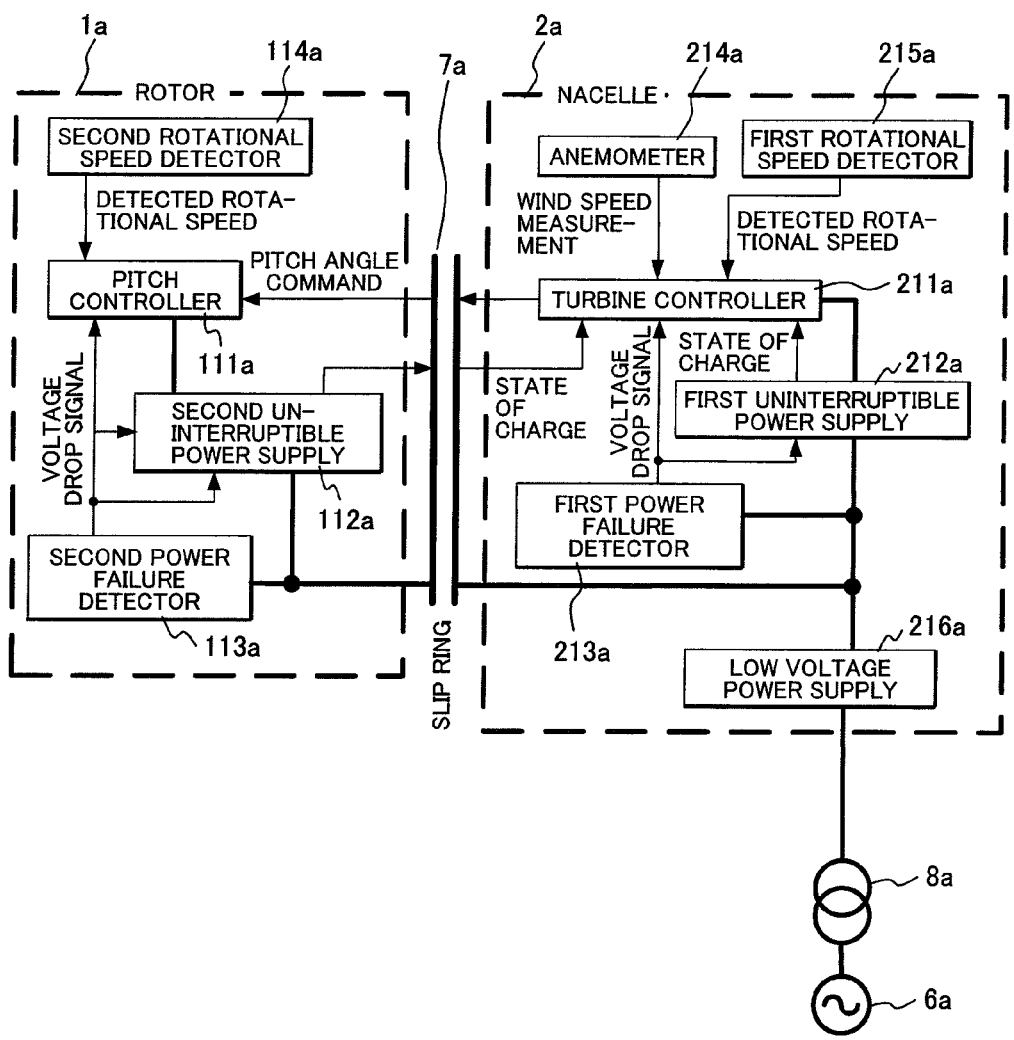
FIG. 6 shows the structure of a pitch angle control mechanism of the wind turbine in a second embodiment of the present invention.

FIG. 6 shows the structure of a pitch angle control mechanism of the wind turbine in the second embodiment of the present invention. This structure enables control for maintaining the rotational speed during a grid fault. A pitch controller 111*a*, second uninterruptible power supply 112*a*, second power failure detector 113*a*, and second rotational speed detector 114*a* are disposed in a rotor 1*a* of the wind turbine. A turbine controller 211*a*, first uninterruptible power supply 212*a*, first power failure detector 213*a*, low voltage power supply 216*a*, and first rotational speed detector 215*a* are disposed in a nacelle 2. The turbine controller 211*a*, first uninterruptible power supply 212a, first power failure detector 213a, and low voltage power supply 216a may be disposed in a tower 3.

In a normal power generation state before a grid fault, the pitch controller 111a changes the pitch angle according to a pitch angle command created by the turbine controller 211a from a wind speed measured by an anemometer 214a and a rotational speed detected by the first rotational speed detector 215a.

When the power grid voltage drops due to a grid fault, the wind turbine performs operation as follows. First, in the nacelle 2a, the first uninterruptible power supply 212a detects a voltage drop caused by the grid failure and sends a voltage drop signal to the turbine controller 211a and first uninterruptible power supply 212a. Since the low voltage power supply 216a can no longer supply electric power due to the voltage drop, the first uninterruptible power supply 212a supplies internally stored electric power to the detectors and control units including the turbine controller 211a.

Figure 7:
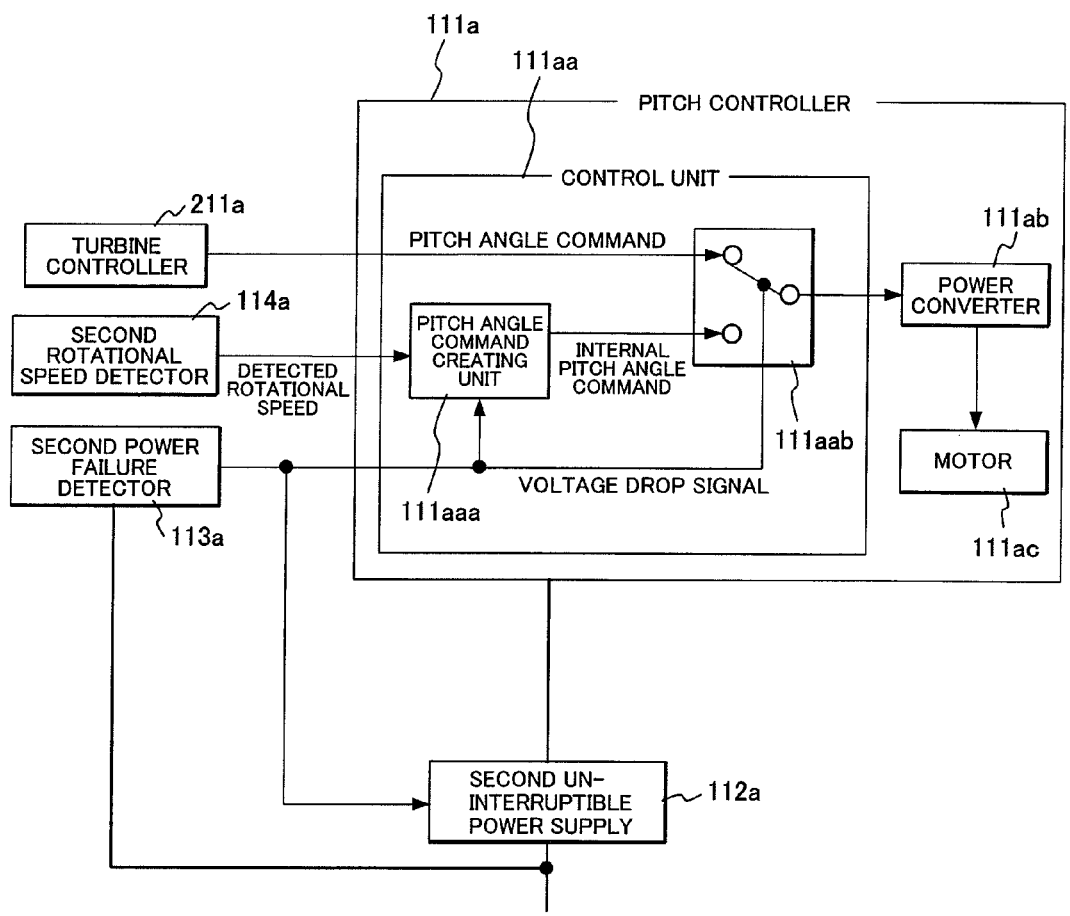
FIG. 7 shows a structure of the pitch controller in the second embodiment.

FIG. 7 shows a structure of the pitch controller in the second embodiment. Operation in the rotor 1a will be described with reference to FIG. 7. The second power failure detector 113a detects a voltage drop due to a grid failure and sends a voltage drop signal to the pitch controller 111a and second uninterruptible power supply 112a. Upon receipt of the voltage drop signal, the pitch controller 111a has a pitch angle command creating unit 111aaa in it to create a pitch angle command, without responding to the pitch angle command sent from the turbine controller 211a. The pitch controller 111a changes the pitch angle according to the internally created pitch angle command.

During a grid fault, the power grid voltage is low, so all generated electric power are not supplied to the power grid. Energy not supplied to the power grid is stored as rotational energy of the rotor. If the pitch angle before the grid failure is maintained during the grid fault, input energy of the wind to the rotor 1a is not reduced, thereby increasing the rotational speed of the rotor. If the rotational speed rise is large, a rotational speed area within which the electric power generator can operate is exceeded. When this happens, the power generation state is not restored at recovery from the grid fault. Conversely, when the wind speed is lowered quickly during a grid fault, the rotational speed of the rotor is lowered. If the drop in the rotational speed is large and the rotational speed area in which operation is possible is exceeded, the power generation state cannot also be restored at recovery from the grid fault.

Figure 8:
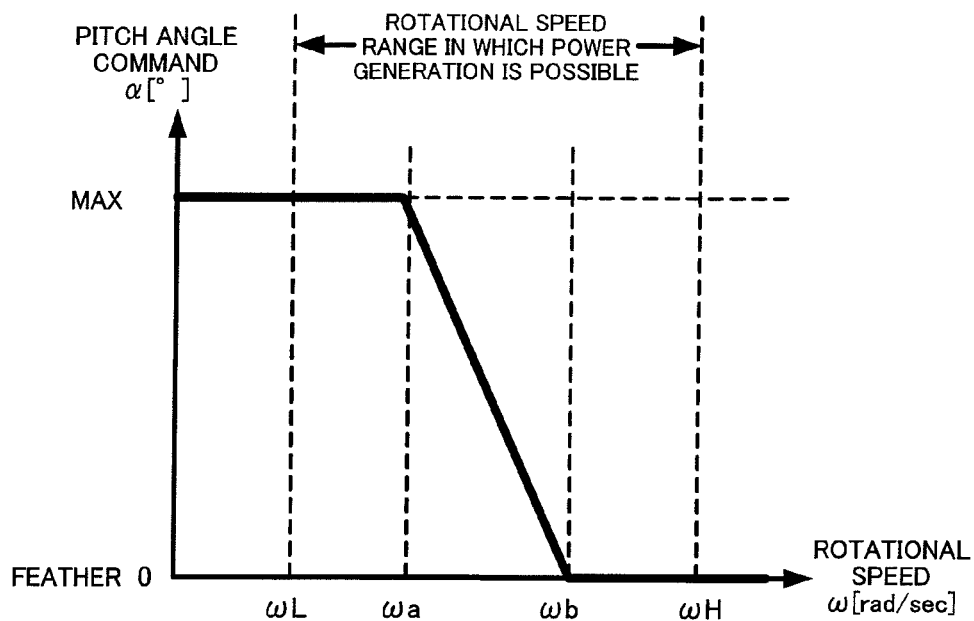
FIG. 8 is a first graph that illustrates the pitch angle command creating unit in the second embodiment of the present invention.

To restore the power generation state when the grid fault is removed, the rotational speed of the rotor has been preferably controlled to within the range in which power generation is possible. FIG. 8 shows an example illustrating the pitch angle command creating unit 111aaa, which maintains the rotational speed.

FIG. 8 is a first graph that illustrates the pitch angle command creating unit in the second embodiment of the present invention; the horizontal axis indicates the rotational speed $\omega$ (rad/s) and the vertical axis indicates the corresponding commanded pitch angle $\alpha$ (°). A lower limit and upper limit of the rotational speed range allowing power generation are represented by $\omega L$ and $\omega H$, respectively. A range within which the rotational speed $\omega$ should be kept during a grid failure is defined as being from $\omega a$ to $\omega b$. These rotational speeds have the following relationship: $\omega L < \omega a < \omega b < \omega H$. If the rotational speed $\omega$ detected by the second rotational speed detector is higher than $\omega L$ but lower than $\omega a$, the pitch angle $\alpha$ of the blade is increased to prevent the rotational speed from falling down below the range allowing power generation. Conversely, if the rotational speed $\omega$ is higher than $\omega b$ but lower than $\omega H$, the pitch angle $\alpha$ is changed in the feather direction to prevent the rotational speed from exceeding the range allowing power generation. In a range from $\omega a$ to $\omega b$, the pitch angle is changed slowly in proportion to the rotational speed. This type of arrangement enables the rotational speed of the blade to be maintained in the operable range.

Figure 9:
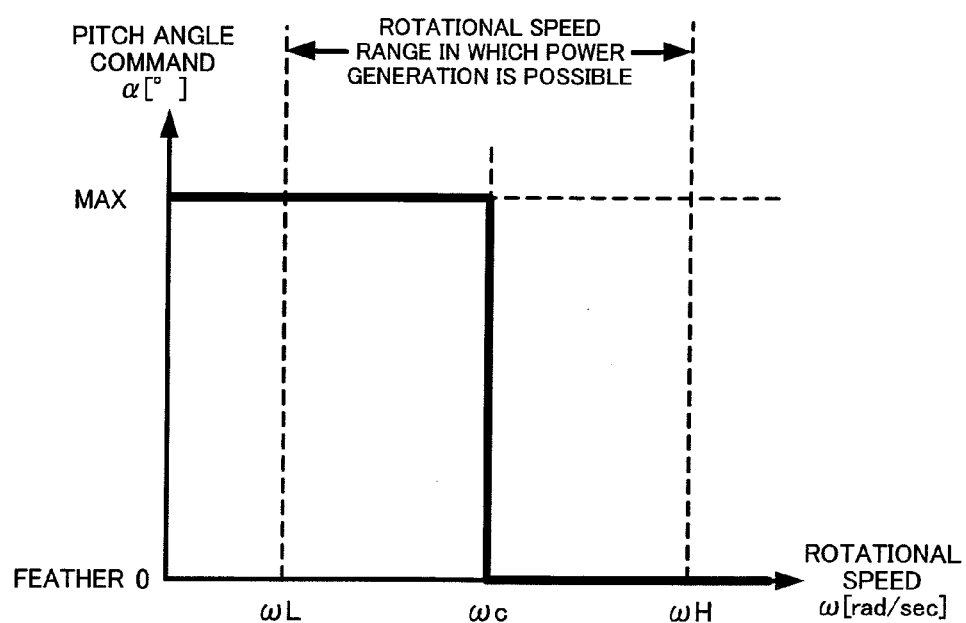
FIG. 9 is a second graph that illustrates the pitch angle command creating unit in the second embodiment of the present invention.
Figure 10:
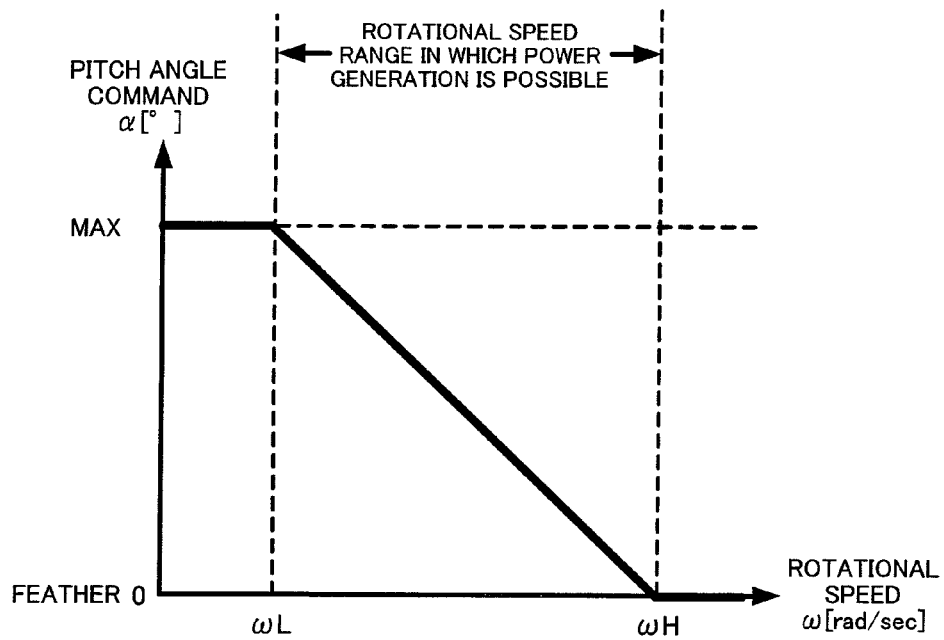
FIG. 10 is a third graph that illustrates the pitch angle command creating unit in the second embodiment of the present invention.

FIGS. 9 and 10 are a second graph and third graph, respectively, that illustrate the pitch angle command creating unit in the second embodiment of the present invention. The methods shown in these drawings may be used for the pitch angle command creating unit 111aaa of the pitch controller 111a, which creates a pitch angle command from a detected rotational speed.

When the grid failure is recovered, the power failure detector in the nacelle 2a detects the recovery from the grid failure and sends a voltage drop cancellation signal to the turbine controller 211a. In the rotor 1a, the second power failure detector detects the recovery from the grid failure and sends a cancellation signal to the pitch controller 111a. The pitch controller 111a changes the pitch angle according to the pitch angle command sent from the turbine controller 211a to shift to the power generation state before the grid failure.

If the grid fault continues for a long period of time, the wind turbine must be disconnected according to the guideline of the system linkage. For this reason, if a prescribed time passes after the pitch controller 111a receives a voltage drop signal, the pitch controller 111a stops the control for maintaining the rotational speed, described above, and changes the pitch angle to the feather state by searching the data table in the internal memory for a pitch angle by which a feather position is obtained.

This completes the description of the advantages of operation at the occurrence of a grid fault, which are brought by disposing two rotational speed detectors in the rotor and nacelle. The rotational speed duplication also brings other advantages described below.

In normal power generation operation, the pitch controller 111a changes the pitch angle according to the pitch angle command from the turbine controller 211a. However, for example, the first rotational speed detector 215a in the nacelle may detect a rotational speed $\omega$ incorrectly due to a failure. The turbine controller 211a creates a pitch angle command according to the incorrect rotational speed, so the created pitch angle command is also incorrect. This prevents the rotational speed from being maintained.

Figure 11:
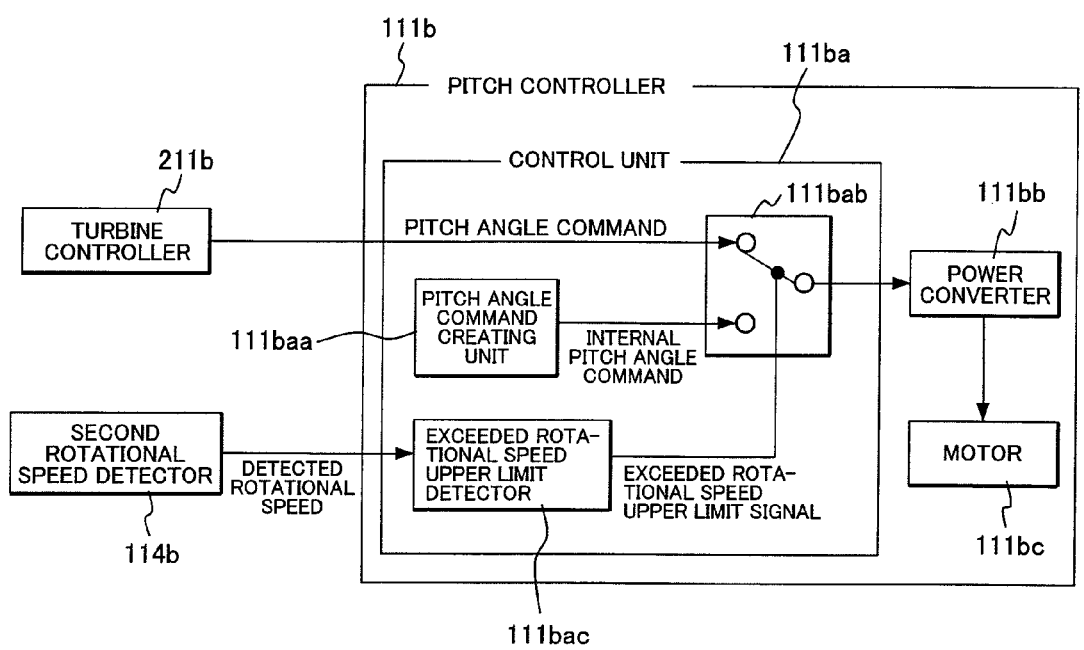
FIG. 11 shows another structure of the pitch controller in the second embodiment.

FIG. 11 shows another structure of the pitch controller in the second embodiment. Since the second rotational speed detector 114b is also disposed in the rotor 1a, the above situation, in which the rotational speed cannot be maintained, can be avoided. Specifically, an exceeded rotational speed upper limit detector 111bac may determine that the rotational speed detected by a second rotational speed detector 114b disposed in the rotor 1a exceeds the upper limit of the rotational speeds at and below which power generation is possible. In this case, the pitch controller 111b does not respond to the pitch angle command from the turbine controller, but controls the pitch angle by following the pitch angle command internally created by a pitch angle command creating unit 111baa. The value of the pitch angle command internally created is preferably a value of a feather-state pitch angle command in order to suppress a rotational speed rise. This operation suppresses an excessive rise of the rotational speed of the rotor 1a.

The rotational speed detector 215 (215a) disposed in the conventional nacelle is an encoder. With the second rotational speed detector 114a (114b) connected in the rotor 1a in this embodiment, the rotor itself, which fixes the second rotational speed detector 114a (114b), rotates, so a method different from the method applied to the conventional rotational speed detector is needed. An embodiment of the second rotational speed detector 114a (114b) in the rotor will be described below.

Figure 12:
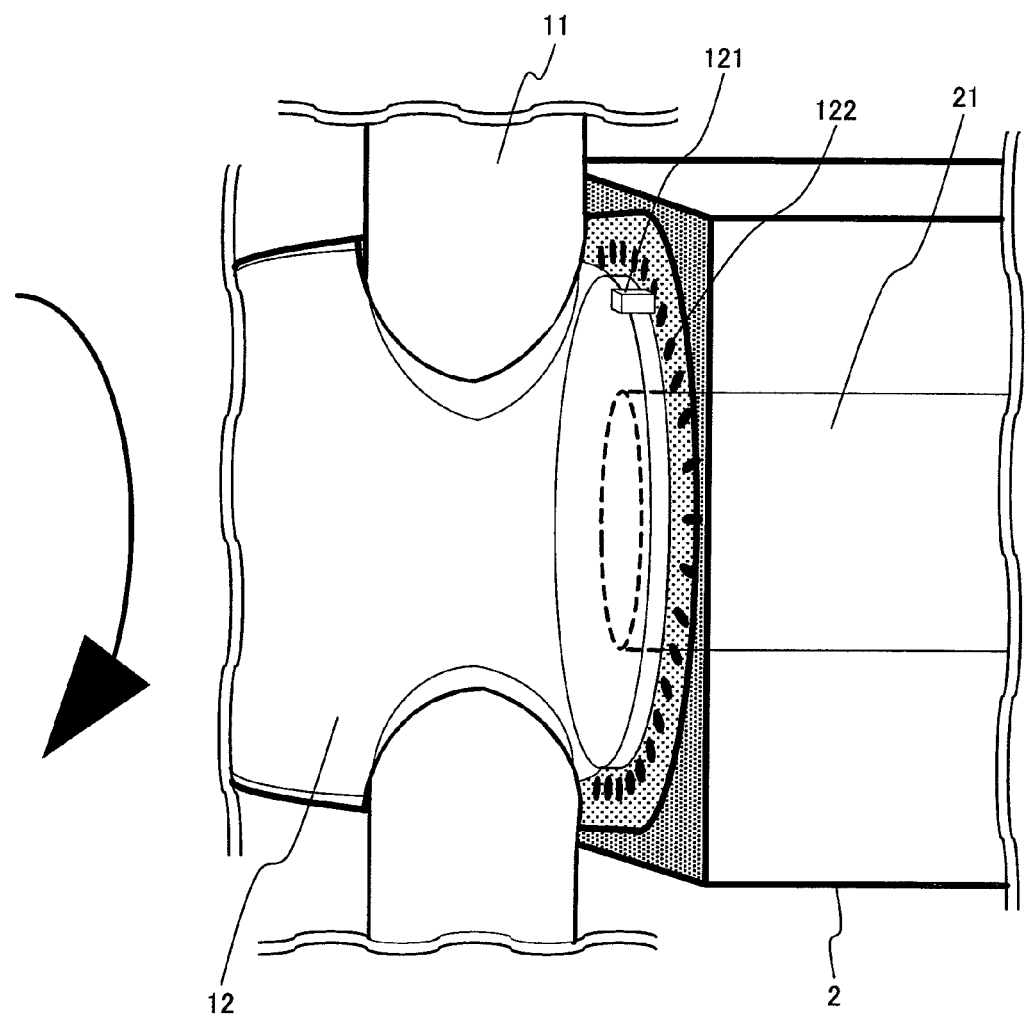
FIG. 12 shows a first exemplary structure of the rotational speed detector in the rotor in the second embodiment of the present invention.

FIG. 12 shows a first exemplary structure of the rotational speed detector in the rotor in the second embodiment of the present invention. In a first example of the first rotational speed detector 114a (114b) in the rotor, a photoelectric sensor is used. As shown in the drawing, a photoelectric sensor 121 is attached in the hub 12, and dugs 122 are provided circumferentially on the cross section on the hub side of the nacelle 2. The photoelectric sensor 121 detects the position of a dug 122 according to the difference in the reflection rate. This arrangement enables the rotational speed of the rotor 1 to be detected according to the number of dugs 122 detected in a unit time.

Figure 13:
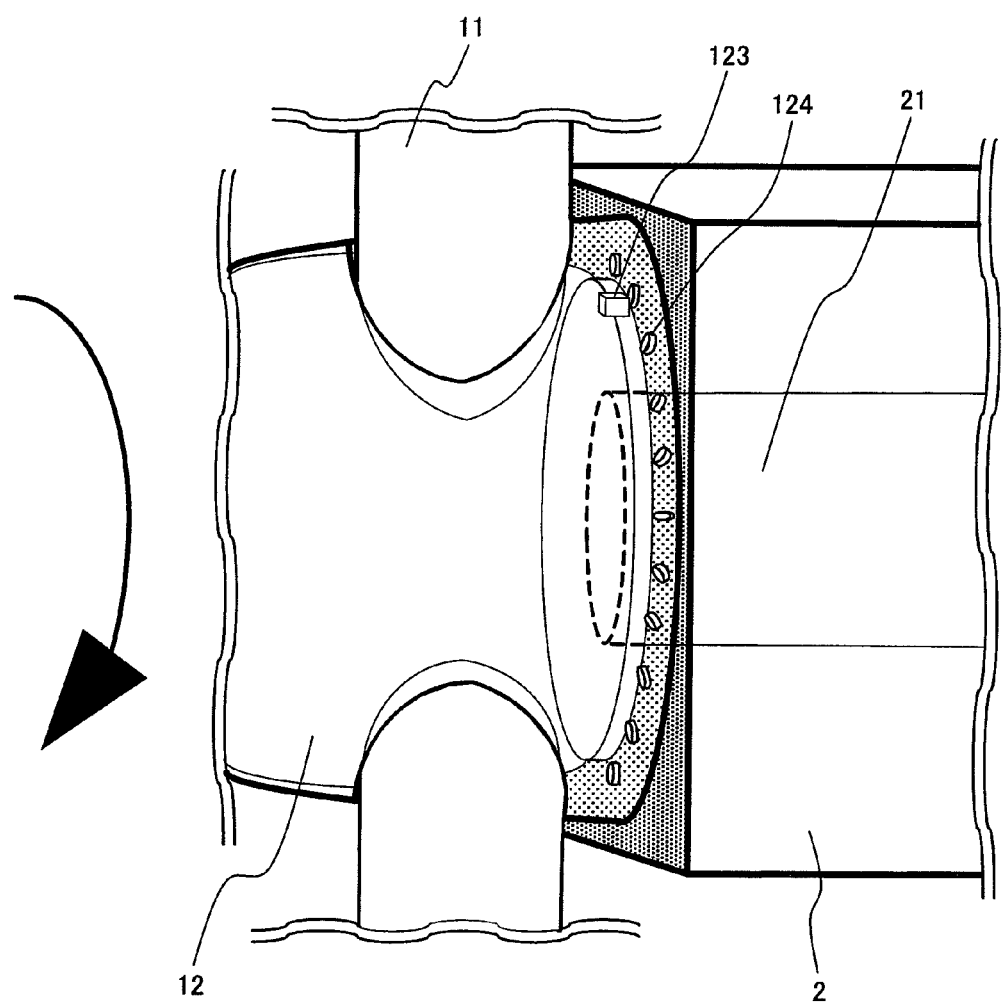
FIG. 13 shows a second exemplary structure of the rotational speed detector in the rotor in the second embodiment of the present invention.

FIG. 13 shows a second exemplary structure of the rotational speed detector in the rotor in the second embodiment of the present invention; in this rotational speed detector, a proximity sensor 123 is used. As shown in the drawing, the proximity sensor 123 is attached in the hub 12, and dugs 124 are provided circumferentially on the cross section on the hub side of the nacelle 2. The proximity sensor 123 detects the position of a dug 124 according to the difference in the distance to the dug 124. This arrangement enables the rotational speed of the rotor 1 to be detected according to the number of dugs 124 detected by the proximity sensor 123 in a unit time.

In a third exemplary structure of the rotational speed detector in the rotor, a strain sensor is used. A strain sensor is attached to the hub 12 or blade 11. Strain of the hub 12 or blade 11 due to the rotational acceleration caused by the rotation of the rotor 1a is measured. Since the magnitude of the strain is determined according to the rotational speed, the rotational speed of the rotor 1a is obtained from the measured strain.

In a fourth exemplary structure of the rotational speed detector 114a (114b) in the rotor, a gyro sensor is used. A gyro sensor is disposed in the hub 12. Since the gyro sensor can measure a rotational speed, it can directly detect the rotational speed of the rotor 1.

Figure 14:
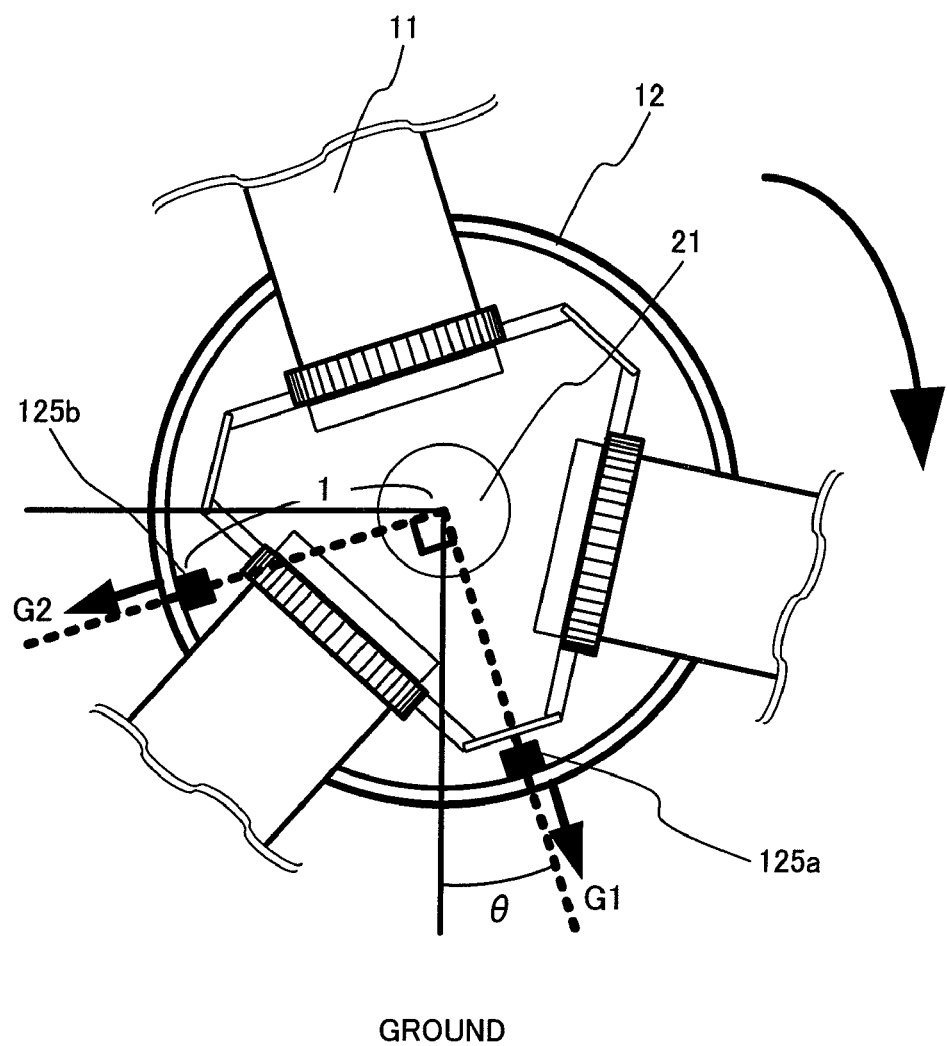
FIG. 14 shows a fifth exemplary structure of the rotational speed detector in the rotor in the second embodiment of the present invention.

FIG. 14 shows a fifth exemplary structure of the rotational speed detector in the rotor in the second embodiment of the present invention; in this rotational speed detector, acceleration sensors are used. As shown in FIG. 14, two acceleration sensors 125a and 125b, which can detect a polarity and DC component, are disposed on lines that form right angles on the internal wall of the hub 12. When the distance from the central axis of rotation to each acceleration sensor is "r", the radial accelerations G1 and G2 measured by the acceleration sensors in FIG. 13 and the acceleration G by the rotor rotation at a detection point are then represented as shown in equations (1) to (3).

$$G_1 = G + g \cdot \cos\theta \quad (1)$$

$$G_2 = G + g \cdot \sin\theta \quad (2)$$

$$G = r\omega^2 \quad (3)$$

where "g" is the acceleration of gravity, θ is an angle formed by the orientation of the acceleration sensor and the direction of the acceleration of gravity. θ is obtained from G1 and G2 in these equations, as indicated by equation (5).

$$G_1 - G_2 = g \cdot (\cos\theta - \sin\theta) \quad (4)$$

$$= g \cdot \sqrt{2} \cdot \sin(\theta - 45°)$$

$$\theta = \arcsin\left(\frac{G_1 - G_2}{g \cdot \sqrt{2}}\right) + 45° \quad (5)$$

From equations (1) and (2), the rotational speed ω of the rotor is calculated as indicated by equation (7).

$$G = r\omega^2 = G_1 - g \cdot \cos\theta \quad (6)$$

$$\omega = \sqrt{\frac{G_1 - g \cdot \cos(\theta)}{r}} \quad (7)$$

$$= \sqrt{\frac{G_1 - g \cdot \cos\left(\arcsin\left(\frac{G_1 - G_2}{g \cdot \sqrt{2}}\right) + 45°\right)}{r}}$$

As described above, the rotational speed ω of the rotor 1 can be obtained by using the two acceleration sensors 125a and 125b.

Figure 15:
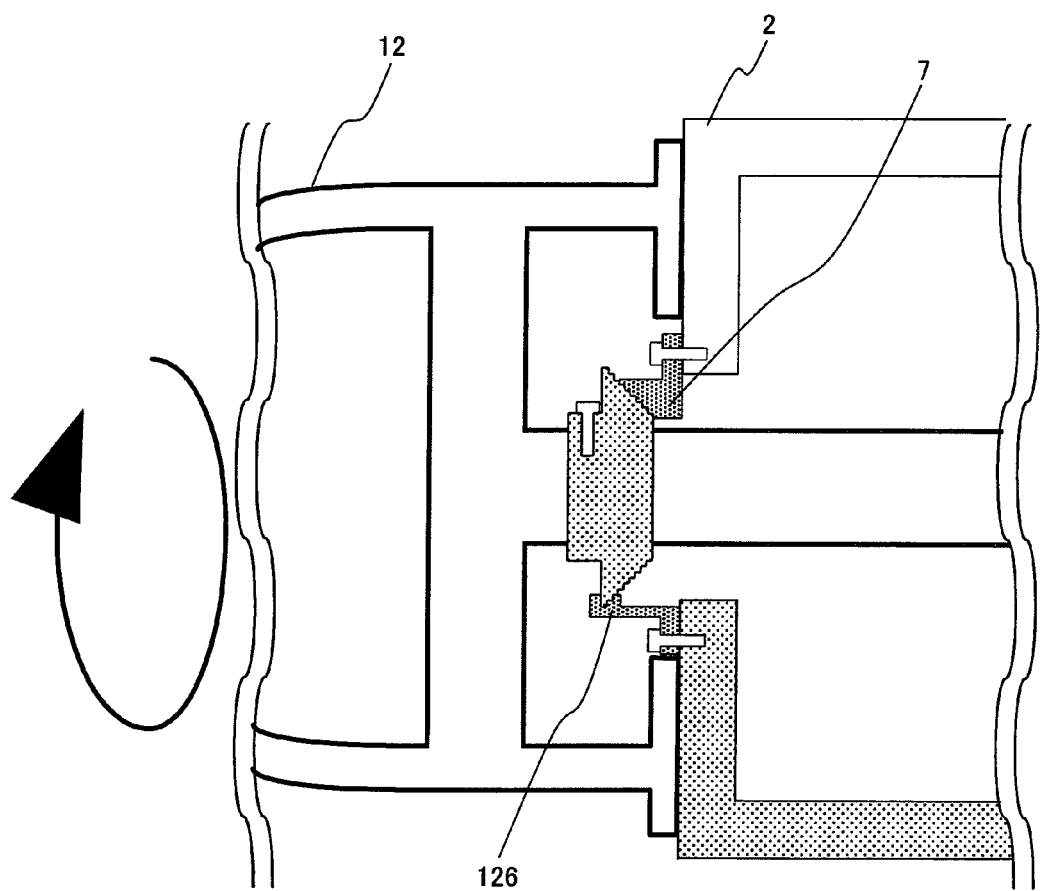
FIG. 15 shows a sixth exemplary structure of the rotational speed detector in the rotor in the second embodiment of the present invention.

FIG. 15 shows a sixth exemplary structure of the rotational speed detector in the rotor in the second embodiment of the present invention; in this rotational speed detector, a rotary encoder is used. As shown in FIG. 15, part at an end of the slip ring 7 is used as a rotary encoder 126, enabling a rotational speed to be detected.

Figure 16:
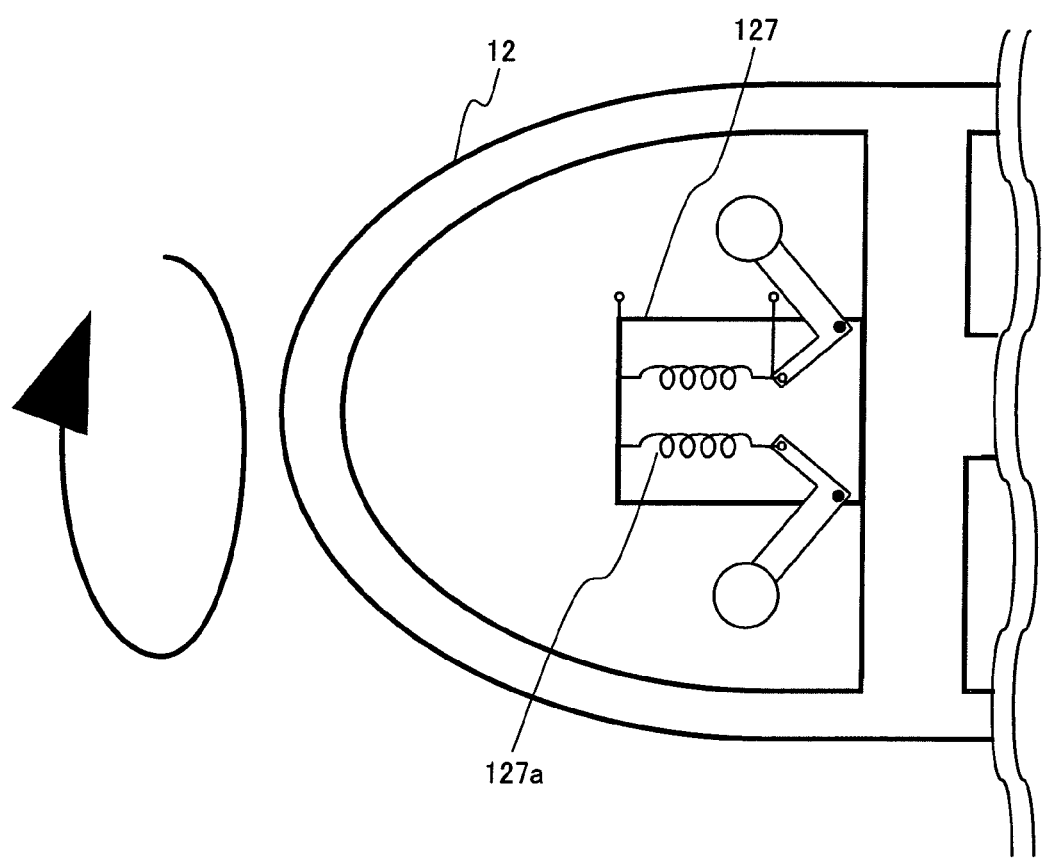
FIG. 16 shows a seventh exemplary structure of the rotational speed detector in the rotor in the second embodiment of the present invention.

FIG. 16 shows a seventh exemplary structure of the rotational speed detector in the rotor in the second embodiment of the present invention; in this rotational speed detector, a governor is used. Although various types of governors are available, a governor 127 may be attached, for example, at the center of the rotation of the hub 12, as shown in FIG. 16. The length of a spring 127a in the governor 127 changes due to centrifugal force, so the rotational speed can be obtained from a measurement of the length of the spring 127a.

Figure 17:
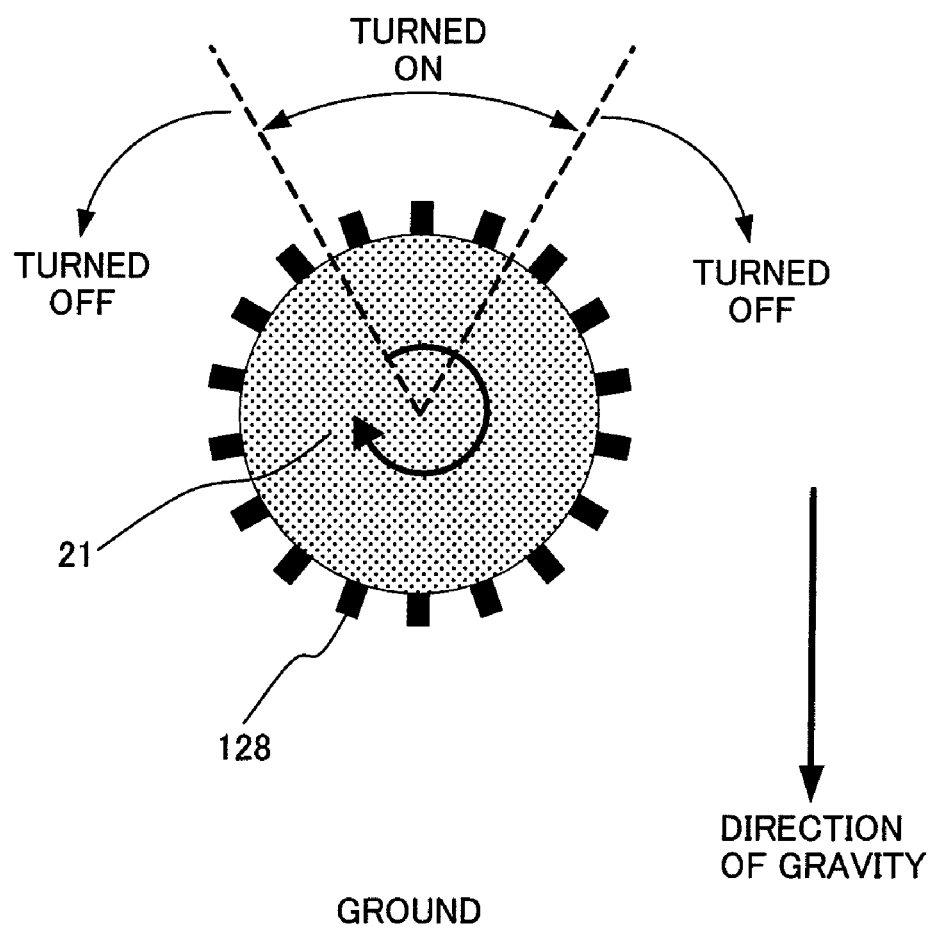
FIG. 17 shows an eighth exemplary structure of the rotational speed detector in the rotor in the second embodiment of the present invention.

FIG. 17 shows an eighth exemplary structure of the rotational speed detector in the rotor in the second embodiment of the present invention; in this rotational speed detector, a plurality of tilt switches are used. As shown in FIG. 17, a plurality of tilt switches 128 are disposed around the shaft 21. The tilt switch 128 outputs an ON signal when the angle formed by the orientation of the tilt switch 128 and the direction of gravity reaches or exceeds a prescribed value, and outputs an OFF signal in other states. When the positions of the tilt switches 128 and the times at which they are turned on are measured, the rotational speed of the rotor 1 can be obtained.

Figure 18:
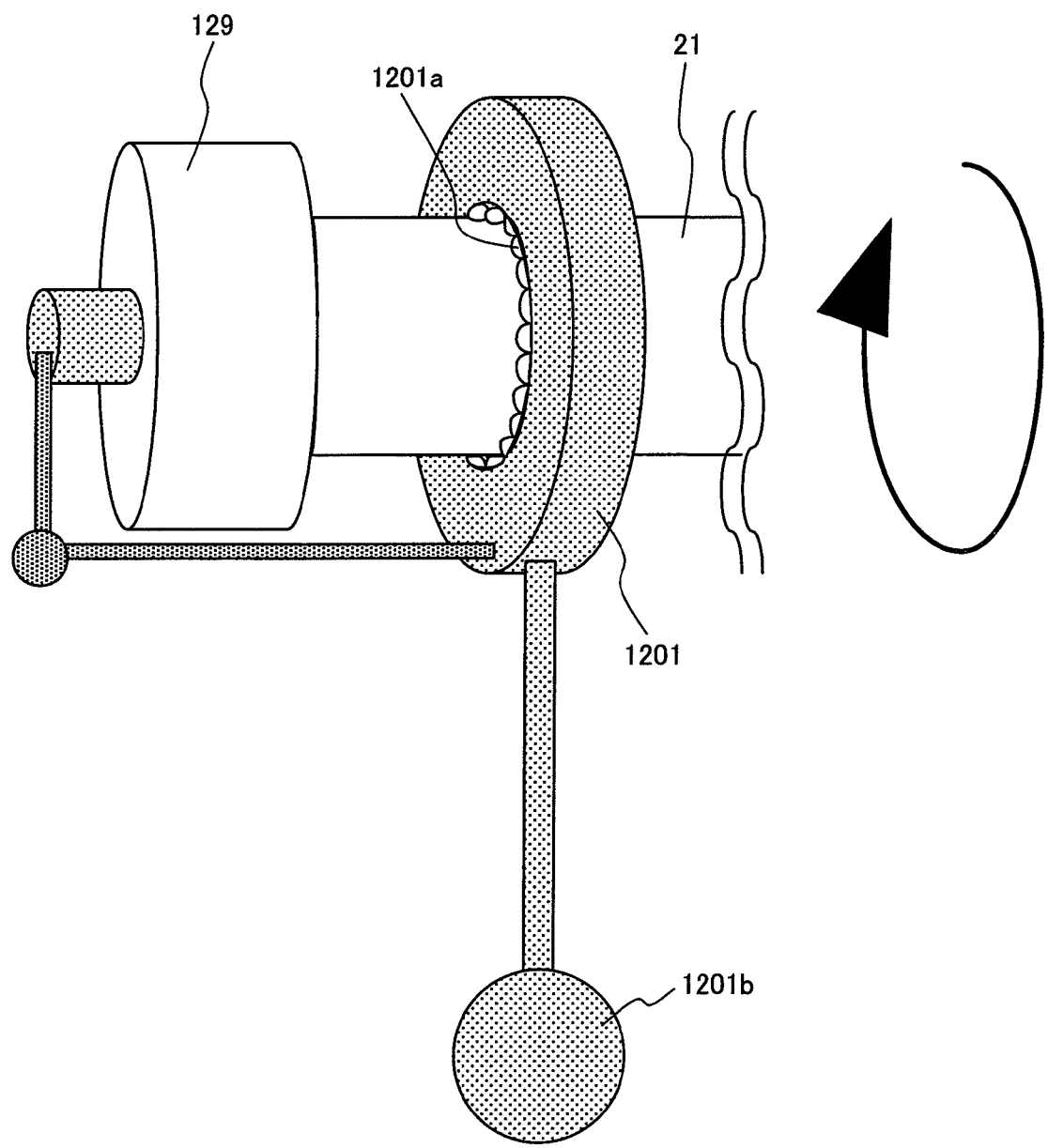
FIG. 18 shows a ninth exemplary structure of the rotational speed detector in the rotor in the second embodiment of the present invention.

FIG. 18 shows a ninth exemplary structure of the rotational speed detector in the rotor in the second embodiment of the present invention; in this rotational speed detector, a balancer and rotary encoder are used. As shown in FIG. 18, a balancer 1201 is disposed on the shaft 21, and a rotary encoder 129 is disposed at the end of the shaft 21. A bearing 1201a enables the balancer 1201 to operate independently of the shaft 21. The balancer 1201 always faces in the direction of gravity due to a weight 1201b, always fixing the relative positions of the balancer 1201 and nacelle 2. A non-rotational part of the encoder 129 is connected to part of the balancer 1201. This type of arrangement enables the rotational speed of the rotor 1 to be measured by use of the encoder 129.

Figure 19:
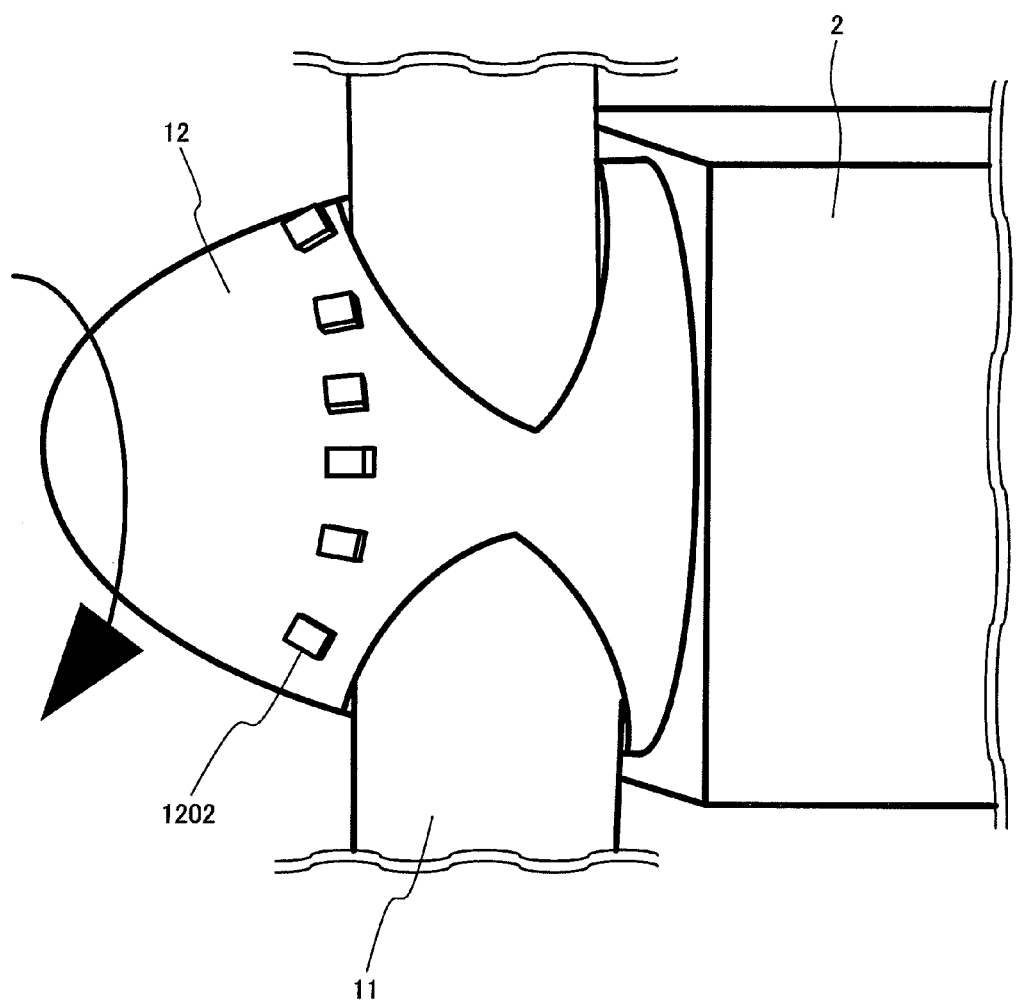
FIG. 19 shows a tenth exemplary structure of the rotational speed detector in the rotor in the second embodiment of the present invention.

FIG. 19 shows a tenth exemplary structure of the rotational speed detector in the rotor in the second embodiment of the present invention; in this rotational speed detector, distance sensors are used. As shown in FIG. 19, a plurality of distance sensors 1202 are provided around an outer periphery of the rotor 1. Each distance sensor 1202 uses a laser beam or ultrasonic wave to measure the distance between the distance sensor 1202 and ground. A measured distance signal from the distance sensor 1202 indicates the shortest distance at a moment when the sensor faces the ground, so a moment at which the distance sensor 1202 faces the ground can be detected. When time intervals at which the plurality of distance sensors face the ground are measured, the rotational speed of the rotor 1 can be obtained.

As described above, the rotational speed of the hub 12 can be detected by use of the second rotational speed detector 114a or 114b in the hub 12. Even if a correct pitch angle command cannot be transferred, when this detected rotational speed is used, rotational speed control based on pitch angle control is enabled. Accordingly, more reliable pitch angle control is achieved, preventing the rotor 1 from running excessively.

Third Embodiment

Figure 20:
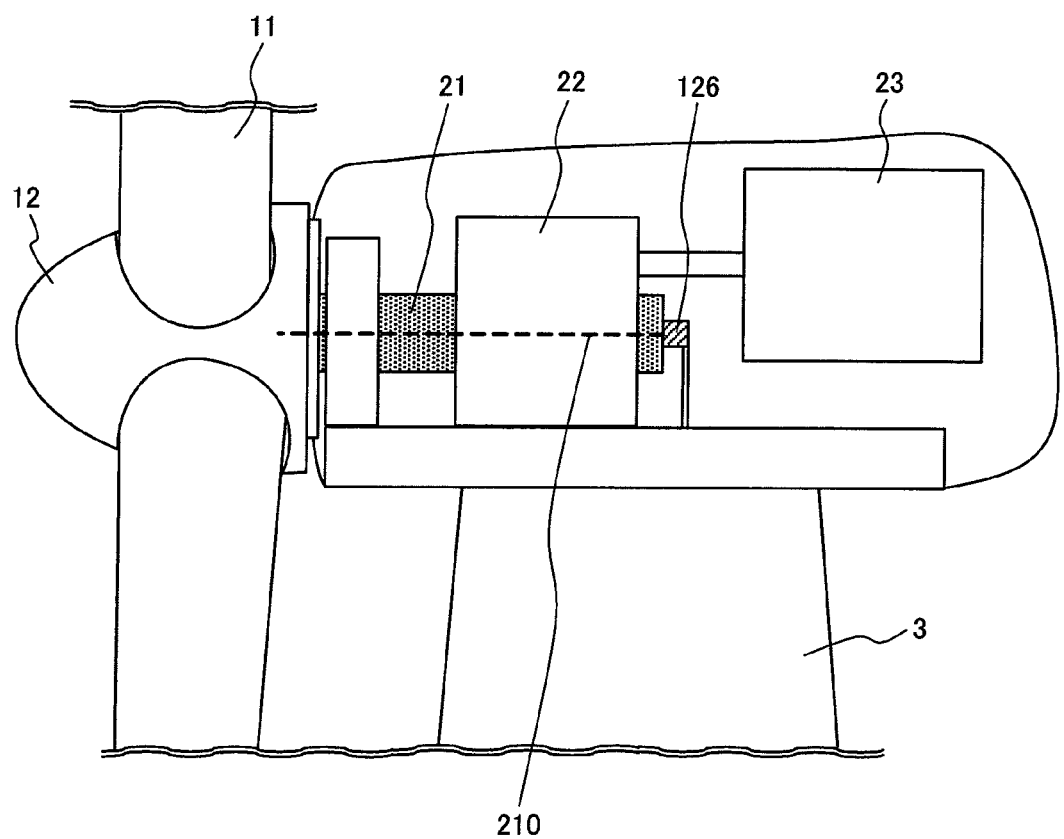
FIG. 20 shows the structure of the wind turbine in a third embodiment of the present invention.

FIG. 20 is a structural diagram of a wind turbine according to a third embodiment of the present invention. In this embodiment, a rotational speed detector is connected to one end of the shaft in the nacelle, and a detected rotational speed value signal is transmitted to the rotor 1 through a wire in the shaft.

In this embodiment, as shown in FIG. 20, the rotary encoder 126 is disposed at one end of the shaft 21 in the nacelle 2. In the present invention, the rotary encoder 126 is disposed differently from the conventional rotary encoder so that the detected rotational speed value is transmitted to the inside of the rotor 1 without passing through the slip ring. In the conventional structure, the rotating part of the rotary encoder is fixed to the shaft 21, and the fixed part is fixed to the nacelle 2. Conversely, in this embodiment, the rotational part of the rotary encoder 126 is fixed to the nacelle 2, and the fixed part is fixed to the shaft 21. The signal line connected to the fixed part of the rotary encoder 126 and the power line are connected to wiring 210 in the shaft. When the rotational speed detector is attached to the part that runs at the same rotational speed as the pitch controller as described above, the electric power of the rotary encoder 126 and the rotational speed value detected by the rotary encoder 126 can be transmitted between the rotor 1 and the nacelle 2 without passing through the slip ring.

The above structure enables rotational speed control by pitch angle control even if the slip ring fails and a pitch angle command cannot be thereby transmitted correctly. Accordingly, more reliable pitch angle control is possible, preventing the rotor 1 from rotating at excessive speed.

Fourth Embodiment

Figure 21:
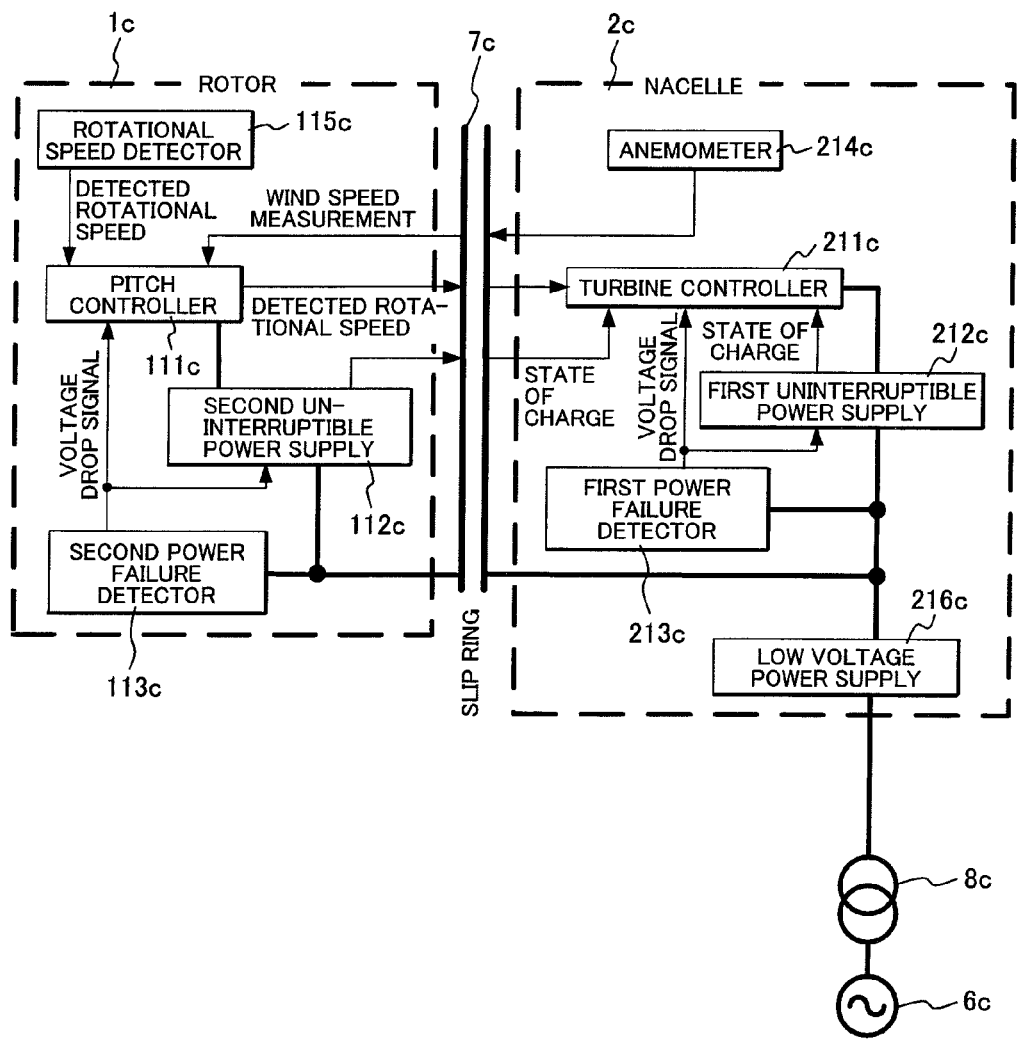
FIG. 21 shows the structure of a pitch angle control mechanism of the wind turbine in a fourth embodiment of the present invention.

FIG. 21 shows the structure of a pitch angle control mechanism of the wind turbine in a fourth embodiment of the present invention. This embodiment features that the rotational speed detector of the rotor is disposed only in the rotor.

In this embodiment, a pitch controller 111c, second uninterruptible power supply 112c, second power failure detector 113c, and rotational speed detector 115c are disposed in a rotor 1c. A turbine controller 211c, first uninterruptible power supply 212c, first power failure detector 213c, and low voltage power supply 216c are disposed in a nacelle 2c. The turbine controller 211c, first uninterruptible power supply 212c, first power failure detector 213c, and low voltage power supply 216c may be disposed in a tower. A slip ring 7c is passed through when electric signals and power are transmitted between the rotor 1c and nacelle 2c.

A method of controlling the pitch angle will be described below. The pitch controller 111c receives a detected rotational speed of the rotor 1c from the rotational speed detector 115c in the rotor 1c. The pitch controller 111c also receives a measured wind speed from the nacelle side through the slip ring 7c by means of a signal from an anemometer 214c attached to the nacelle 2c. The pitch controller 111c creates a pitch angle command from the detected rotational speed and measured wind speed that it received and changes the pitch angle.

The turbine controller 211c receives the rotational speed detected by the pitch controller 111c in the rotor 1c through the slip ring 7c. The turbine controller passes the obtained speed signal as a phase and speed signal to the power converter. The power converter controls electric power of the electric power generator according to the obtained phase and speed signals.

If the pitch controller 111c cannot receive the wind speed measured by the anemometer 214c due to a failure in the slip ring 7c, the pitch controller 111c creates a pitch angle command by which the pitch angle enters the feather state and changes the pitch angle to the feather state. Similarly, if the second power failure detector 113c detects a grid fault, the pitch controller 111c controls the pitch angle by the method described in the second embodiment, according to the rotor rotational speed measured in the rotor 1c.

In the arrangement described above, even if the slip ring 7c fails, rotational speed control is still facilitated, thereby preventing the rotor in the wind turbine from rotating excessively.

Fifth Embodiment

Figure 22:
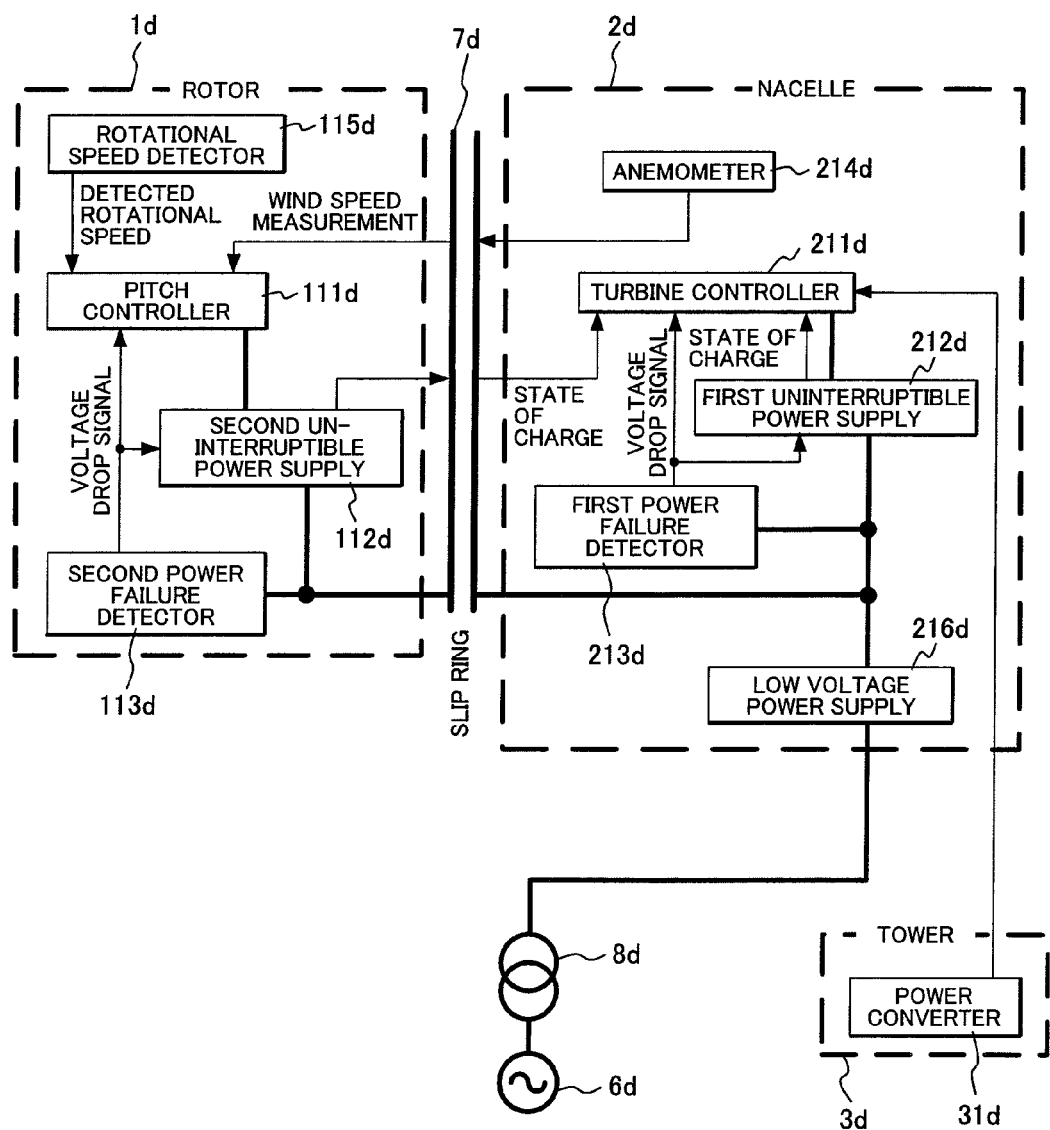
FIG. 22 shows the structure of a pitch angle control mechanism of the wind turbine in a fifth embodiment of the present invention.

FIG. 22 shows the structure of a pitch angle control mechanism of the wind turbine in a fourth embodiment of the present invention. In this embodiment, a rotational speed detector is disposed only in the rotor of the wind turbine. In FIG. 22, the rotational speed of a rotor 1d is measured by a rotational speed detector 115d in the rotor. A pitch controller 111d creates a pitch angle command from a rotational speed measured in the rotor 1d and the wind speed measured by an anemometer 214d and transmitted through a slip ring 7d.

Used as the rotational speed of the power generator is the rotational speed obtained by speed sensorless control performed by a power converter 31d.

The arrangement described above eliminates the need to receive a detected rotational speed and transmit a pitch angle command between the rotor 1d and nacelle 2d. Even if the slip ring fails, therefore, the rotational speed of the rotor 1d can be still controlled more reliably.

What is claimed is:

1. A wind turbine including a pitch controller, a turbine controller, and a first uninterruptible power supply, the turbine controller having a function for creating a pitch angle command according to a quantity of the state of the wind turbine, a power output of the first uninterruptible power supply being connected to a power input of the turbine controller, wherein:

the wind turbine has a second uninterruptible power supply;

a power output of the second uninterruptible power supply is connected to a power input of the pitch controller;

the pitch controller includes
a pitch angle command creating unit that has a function of changing a pitch angle according to a pitch angle command received from the turbine controller and
another function of creating a pitch angle command internally, according to a reception error detected based on the pitch angle command received or a voltage drop of electric power supplied to the second uninterruptible power supply; and
the pitch controller has a selector for making a switchover between the pitch angle command created by the turbine controller according to the quantity of the state of the wind turbine and the pitch angle command internally created by the pitch controller.

2. The wind turbine according to claim 1, wherein the turbine controller and the first uninterruptible power supply are disposed in a nacelle or a tower in the wind turbine; the pitch controller and the second uninterruptible power supply are disposed in a rotor of the wind turbine.

3. The wind turbine according to claim 1, wherein the pitch controller further comprising a pitch angle command reception unit that has a detection function for detecting a reception error in the pitch angle command created by the turbine controller; when the detection function detects a reception error, the pitch controller selects the pitch angle command created by the pitch controller itself.

4. The wind turbine according to claim 1, wherein when the first uniteruptable power supply failed to supply power to the second uninterruptible power supply, the second uninterruptible power supply supplies electric power to the pitch controller; the pitch controller then selects the pitch angle command created therein.

5. The wind turbine according to claim 1, further including:
a first power failure detector in a nacelle or a tower; and
a second power failure detector in a rotor;
wherein when the first power failure detector or the second power failure detector detects a grid failure, the first uninterruptible power supply supplies electric power to the turbine controller and the second uninterruptible power supply supplies electric power to the pitch controller; the pitch controller selects the pitch angle command created therein.

6. The wind turbine according to claim 1, wherein a rotational speed detector for detecting the rotational speed of a rotor of the wind turbine is provided in the rotor.

7. The wind turbine according to claim 6, further including:
a first power failure detector in a nacelle or a tower; and
a second power failure detector in a rotor;
wherein when the first power failure detector or the second power failure detector detects a power supply voltage drop caused by a grid failure, the pitch controller creates a pitch angle command according to a rotational speed detected by the rotational speed detector and selects the pitch angle command created therein so that the rotational speed of the rotor falls within a prescribed range.

8. The wind turbine according to claim 6, wherein if the grid failure continues for a prescribed period or longer, the pitch controller creates a pitch angle command that places a blade in a feather state, and then selects the pitch angle command created by the pitch controller itself so as to place the pitch angle in the feather state.

9. The wind turbine according to claim 8, wherein the pitch controller creates a pitch angle command that places a blade in the feather state slowly in time, and then selects the pitch angle command created by the pitch controller itself so as to place the pitch angle in the feather state slowly in time.

10. The wind turbine according to claim 6, wherein if the rotational speed detected by the rotational speed detector in the rotor is outside a predetermined range, the pitch controller selects the pitch angle command created by the pitch controller itself.

11. The wind turbine according to claim 1, wherein only when a state of charge of the first uninterruptible power supply and a state of charge of the second uninterruptible power supply are greater than respective prescribed values, the wind turbine shifts to an operation state for power generation.

12. The wind turbine according to claim 1, wherein the first uninterruptible power supply and the second uninterruptible power supply each have any one of a storage battery, a capacitor, an electrical double-layer capacitor, and a fuel cell, or may have a combination thereof.

13. The wind turbine according to claim 1, wherein a rotational speed detector for detecting the rotational speed of a rotor is provided in the rotor and another rotational speed detector for detecting the rotational speed of the rotor is provided in a nacelle or a tower.

14. The wind turbine according to claim 5, wherein a rotational speed detector for detecting the rotational speed of the rotor is disposed at a rotating body in the nacelle, the rotating body transmitting the rotation of the rotor in the wind turbine to the nacelle and rotates at the same rotational speed as the pitch controller; the rotational speed measured by the rotational speed detector is transmitted to the pitch controller in the rotor through signal line in the rotating body.

15. The wind turbine according to claim 1, wherein a rotational speed detector is provided only in a rotor; a pitch controller creates a pitch angle command from a rotational speed detected by the rotational speed detector and controls the pitch angle.

16. The wind turbine according to claim 1, wherein:
a rotational speed detector is provided in a rotor in the wind turbine, the rotational speed of the rotor in the wind turbine being detected by the rotational speed detector; and
the rotational speed of a generator in the wind turbine is measured through speed sensorless control by a power converter in the wind turbine.

17. The wind turbine according to claim 1, wherein
the turbine controller has a function for creating the pitch angle command based on a wind speed detected by an anemometer and a detected rotational speeds of a rotor.

18. A method of operating a wind turbine having at least a pitch controller in a rotor, and a first uninterruptible power supply and a turbine controller in a nacelle, the turbine controller having a function for creating a pitch angle command according to a quantity of the state of the wind turbine, a power output of the first uninterruptible power supply being connected to a power input of the turbine controller, and the wind turbine has a second uninterruptible power supply with a power output of the second uninterruptible power supply being connected to a power input of the pitch controller, the method comprising:
changing a pitch angle according to a pitch angle command received from the turbine controller;
creating a pitch angle command internally, by the pitch controller, according to a reception error detected based on the pitch angle command received or a voltage drop of electric power supplied to the second uninterruptible power supply; and
making a switchover between the pitch angle command created by the turbine controller according to the quantity of the state of the wind turbine and the pitch angle command internally created by the pitch controller.

* * * * *